April 19, 1960

G. W. JACKSON 2,933,104

CONTROL MECHANISM

Filed July 5, 1955

INVENTOR.
George W. Jackson
BY
Craig V. Monterow
HIS ATTORNEY

April 19, 1960 G. W. JACKSON 2,933,104
CONTROL MECHANISM
Filed July 5, 1955 2 Sheets-Sheet 2

INVENTOR.
George W. Jackson
BY Craig V. Morton
HIS ATTORNEY

United States Patent Office 2,933,104
Patented Apr. 19, 1960

2,933,104

CONTROL MECHANISM

George W. Jackson, Dayton, Ohio, assignor to General Motors Corporation, Detroit, Mich., a corporation of Delaware Application July 5, 1955, Serial No. 519,897

4 Claims. (Cl. 137—596)

This invention relates to an improved control device for regulating the supply of air to and exhaust of air from a pneumatic suspension system for a motor vehicle.

The invention is particularly adapted for use in connection with a vehicle suspension system in which air springs provide the resilent means for supporting the body of the vehicle upon its running gear or axles. The air spring may be in the form of an air cushion, a bellows or a piston and cylinder inflated or charged with a volume of fluid, preferably air, under sufficient pressure to support the body of the vehicle above the axle.

The total movement between the body of a vehicle and the axle is limited due to various construction arrangements. Passenger vehicles are subject to wide load variations so that if the air springs are inflated with a fluid pressure value sufficient to maintain a predetermined clearance distance between the body and the axle of a vehicle under a relatively light load condition, the pressure in the air spring is insufficient to sustain a heavy load condition without the body of the vehicle striking the axle of the vehicle. Under a heavy load condition it is therefore necessary to increase the fluid pressure within the air spring to sustain the heavier load at a clearance distance from the axle of the vehicle the same as when the vehicle is carrying a light load.

To obtain full benefit from the use of comfortable riding air springs and to avoid "bottoming" on the axle, it is necessary to vary the degree of inflation of the air springs by increasing or decreasing the value of the fluid pressure in the air spring in response to load changes.

Obviously, if the fluid pressure in an air spring is low, that is of a value to properly support the body relative to the axle under a light load condition, that the body will move downwardly toward the axle when the load condition in the body increases. This relative movement between the body and the axle can be utilized to actuate fluid control valves to supply an increased fluid pressure to the air spring to return the body to its former predetermined height clearance between the body and the axle. As the load in the body decreases, the reverse condition will be created and the increased air pressure in the air spring can be exhausted to allow the body to move downwardly toward the axle to the predetermined height clearance.

It is therefore an object of this invention to provide a control device of an improved simplified form that will regulate the supply of pressure fluid to and exhaust of pressure fluid from an air spring to maintain a predetermined height clearance between the body and the axle of the vehicle under varying load conditions.

It is another object of the invention to provide a control device in accordance with the foregoing object wherein the control device is actuated by a pressure differential responsive member that is actuated in a manner to prevent rapid axle oscillations of the vehicle from effecting changes in the pressure value of the fluid in the air springs while the vehicle is traveling over rough road conditions.

Further objects and advantages of the present invention will be apparent from the following description, reference being had to the accompanying drawings wherein a preferred form of the invention is clearly shown.

Figure 1:
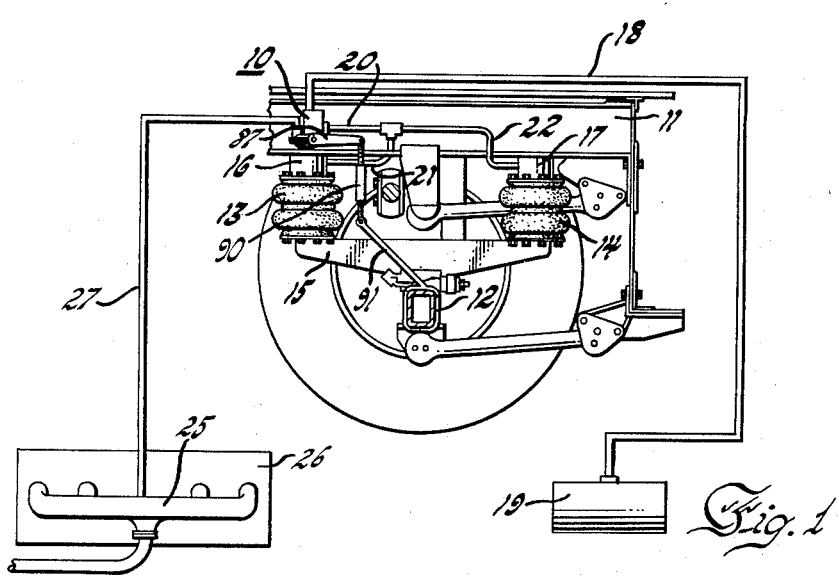
Figure 1 is a schematic illustration of an air spring suspension system for a vehicle incorporating the control device of this invention.
Figure 2:
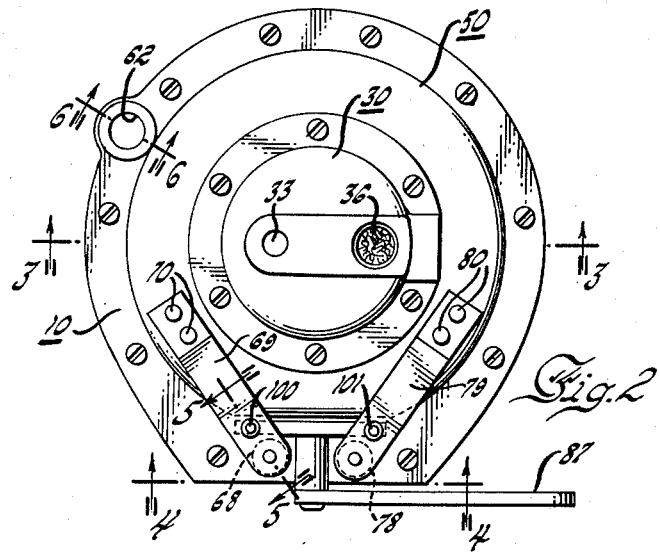
Figure 2 is a plan view of the control device.

Referring to Figure 1, the control device 10 is mounted upon the frame 11 of a vehicle that is supported above the axle 12 by means of the bellows-type air springs 13 and 14. The air springs 13 and 14 are carried on a beam 15 supported on the axle 12, the opposite ends of the bellows engaging support members 16 and 17 that connect the bellows with the vehicle frame 11.

The control device 10 is supplied with air under pressure through a pipe line 18 from an air reservoir 19 that is maintained at a predetermined pressure by a suitable compressor (not shown) driven by the engine of the vehicle. Air under pressure is supplied to the air springs 13 and 14 from the control device 10 through a pipe line 20 that has the two branching lines 21 and 22 supplying the air springs 13 and 14 respectivelyy. The pipe lines 20, 21 and 22 also provide for exhaust of air from the air springs in a manner hereinafter described.

The control device 10 is connected with the manifold 25 of the vehicle engine 26 by a pipe line 27, the manifold vacuum operating a pressure differential responsive member in the control device 10 to effect operation thereof in a manner hereinafter described.

The control device 10 consists of a first housing member 30 that forms a chamber 31. The chamber 31 has an air inlet control valve 32 that is of the conventional type used to prevent escape of air in automobile tires. A suitable port passage 33 connects with the air pressure line 18 with reservoir line 19. The housing 30 contains a second valve 35 that is of the same type as the valve 32 but is positioned in the housing in a reverse position so that the valve will be oppositely acting to the valve 32. The valve 35 provides an exhaust valve for escape of air from the chamber 31 through the exhaust port 36.

The housing 30 has a port opening 37 that connects with the pipe line 20 that feeds the two air springs 13 and 14.

Obviously, when the valve 32 is activated to supply air into the chamber 31 the air will be delivered to the air springs 13 and 14 through pipe lines 20, 21 and 22. On the other hand when the exhaust valve 35 is activated air will exhaust from the chamber 31 and also from the air springs 13 and 14 by return through the pipe lines 21, 22, and 20. Thus, the oppositely acting valves 32 and 35 can supply air to and exhaust air from the air springs 13 and 14 depending upon which one of the two valves is rendered active.

The valve 32 has a valve stem 38 that is engaged by an actuating member 39 when the member moves against an enlarged head 41 on the valve stem 38 to open the valve 32. The exhaust valve 35 has a valve stem 40 that is engaged by the actuating device 39 on upward movement of the device to render the valve 35 active for exhaust of air from the chamber 31 on the movement of the actuator 39 in a direction opposite to its direction of movement for operating the valve stem 38.

The housing member 30 is supported upon a fluid motor housing 50 that has a pressure differential responsive diaphragm 51 dividing the interior of the motor housing 50 into two compartments 52 and 53. The diaphragm 50 is supported throughout its central area by confinement between a pair of plates 54 and 55 that support an actuating stem 56 journaled in the boss 57 extending upwardly from the housing 50. The actuator 39 is carried on the upper end of the stem 56 so that as the stem 56 is moved in opposite directions of movement by opposite movements of the diaphragm 51, the actuator 39 will also be moved in opposite directions for oppositely or alternately operating the valves 32 and 35.

A pair of compression springs 58 and 59 are disposed on opposite sides of the diaphragm 51 tending to hold the same in a neutral position with the actuator 39 out of actuating engagement with either of the valve stems 38 and 40.

Figure 3:
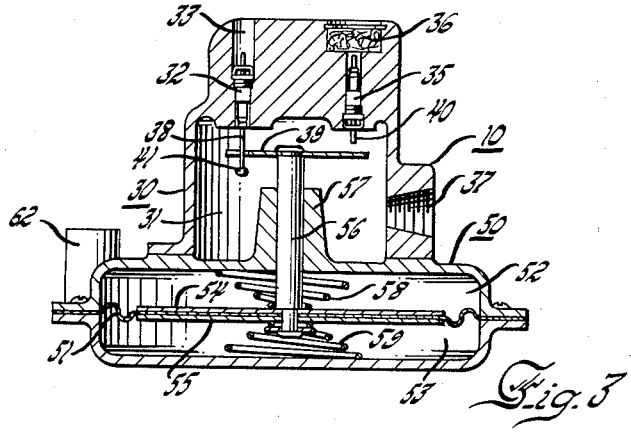
Figure 3 is a vertical cross sectional view taken along line 3—3 of Figure 2.

The chambers 52 and 53 of the fluid motor 50 are connected by the passages 60 and 61 with a common port passage 62 that connects with the vacuum line 27 connected with the manifold 25 of the engine 26. Thus the chambers 52 and 53 are connected with a common source of activating fluid that establishes, or tends to establish, the same pressure value in each of the chambers 52 and 53 on opposite sides of the diaphragm 51 whereby to dispose the diaphragm 51 in a neutral intermediate position as shown in Figure 3 with the valves being inactive and closed.

Figures 5, 6:
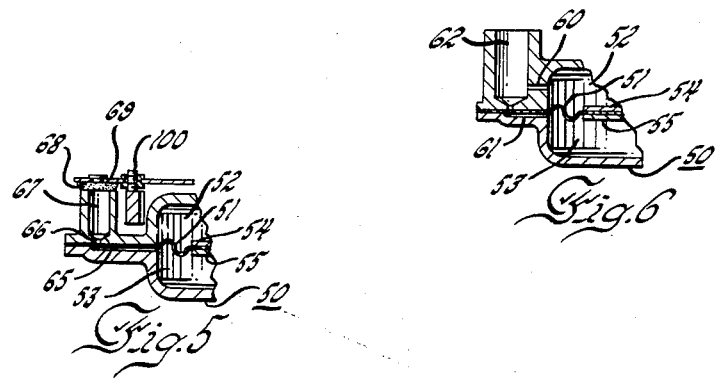
Figure 5 is a cross sectional view taken along line 5—5 of Fig. 2.
Figure 6 is a cross sectional view taken along line 6—6 of Fig. 2.

The chamber 53 of the fluid motor 50 is adapted to be exhausted by means of a port passage 65 communicating with the chamber 53, as shown in Figure 5. The port passage 65 is connected with a passage 66 that in turn is connected with a port passage 67 closed by means of a valve member 68 engaging the upper end of the port 67.

The valve 68 is carried on the free end of a leaf spring member 69 that is secured to the wall of the fluid motor by suitable fastening devices 70. The leaf spring member 69 is biased in a direction to hold the valve 68 on the port 67 to normally retain it in a closed position, as illustrated in Fig. 5.

Figure 4:
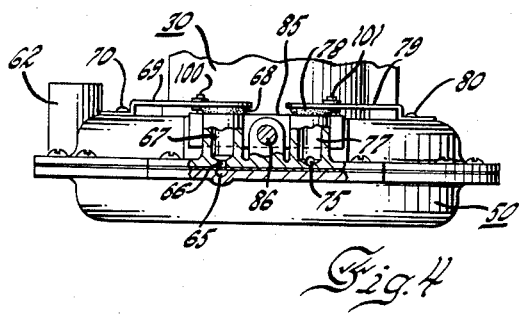
Figure 4 is a view taken along line 4—4 of Fig. 2 with certain portions of the device broken away to clarify the illustration.

Similarly, the chamber 52 is exhausted through a port 75, see Fig. 4, that connects with a port 77 closed by a valve 78 that is carried on the end of a leaf spring 79 suitably mounted on the fluid motor housing by fastening devices 80. The leaf spring member 79 is biased to hold the valve 78 on the port 77 to close the same.

Normally, both valves 68 and 78 close the respective ports 67 and 77 so that no change in fluid pressure value is occasioned in the chambers 53 and 52 respectively, both chambers being connected to the manifold 25 of the vehicle engine.

The valves 68 and 78 are actuated by an oscillatable member 85 that is carried on one end of an oscillatable shaft 86 that has the opposite end thereof connected with actuating lever 87.

As shown in Fig. 1, the actuating lever 87 of the control device 10 is connected with the axle 12 of the vehicle by means of an adjustable link 90 and a rigid arm 91. Movement of the frame 11 toward or away from the axle 12 will cause the actuating lever 87 to be moved upwardly or downwardly and thereby oscillate the shaft 86 which in turn oscillates the actuating member 85 to lift one or the other of the valves 68 or 78 from their respective ports 67 and 77 to allow entrance of air to the respectively connected chambers 53 and 52 on opposite sides of the diaphragm 51.

In Figures 1 and 3 the control device 10 is illustrated as being in an inactive at rest position with the frame 11 of the vehicle in a normal predetermined height from the axle 12. Under such conditions, the fluid pressure in the air springs 13 and 14 is of a value to balance the weight of the body and frame to position the frame 11 at a predetermined height from the axle 12.

When the load in the vehicle is increased, such as when the passengers enter the vehicle, the increased load will cause the vehicle frame 11 to move downwardly toward the axle 12. When this occurs the actuating lever 87 of the control device 10 is moved upwardly, see Fig. 1. Upward movement of the lever 87 causes counter-clockwise rotation of the oscillating shaft 86, see Fig. 4, whereby to cause the valve 78 to be lifted off the port 77 to open the port 77 to atmosphere.

Opening of port 77 to atmosphere allows atmospheric pressure to enter the chamber 52 on the upper side of the diaphragm 51 thereby moving the diaphragm downwardly to cause the actuator bar 39 to engage the head 41 on the valve stem 38 of the air inlet valve 32, whereby fluid pressure from the reservoir tank 19 enters the chamber 31 and passes into the air springs 13 and 14 through the conduit lines 20, 21 and 22 to increase the fluid pressure in the air springs. Fluid is supplied to the air springs through the control device 10 in the manner just described until the frame 11 of the vehicle rises relative to the axle 12 under the new load condition to the previous height distance above the axle 12 to reestablish the predetermined height distance. This relative movement of the frame 11 relative to the axle 12 causes the actuator arm 87 to rotate clockwise, as viewed in Fig. 1, and thereby rotate the oscillatable bar 86 in a clockwise direction to allow the member 85 to permit the valve 78 to close on the port 77. When this occurs the vacuum source, to wit, the manifold 25, reestablishes the same pressure value in the chamber 52 as exists in chamber 53 to allow the diaphragm 51 to move upwardly to the neutral position shown in Fig. 3 whereby the air pressure inlet valve 32 is closed against further admission of air to the air springs 13 and 14. When the load lightens in the vehicle, as when passengers leave the vehicle the reverse action is obtained, that is the frame 11 rises relative to the axle 12 to cause the actuator arm 87 to move downwardly and thereby rotate the oscillatable shaft 86 in a clockwise direction to cause the left hand end of the actuator 85 to lift valve 68 from the port 67, opening the port and allowing atmospheric air to enter the chamber 53 below the diaphragm 51 and cause the diaphragm to move upwardly to engage the actuator bar 39 with the stem 40 of the exhaust valve 35 to open the same and exhaust air from the air springs 13 and 14.

This action occurs until such time as the fluid pressure in the air springs 13 and 14 is reduced to a value to allow the frame 11 to return to the predetermined established height relative to the axle 12 at which time arm 87 rotates the member 85 in a counter-clockwise direction to allow the valve 68 to close on port 67 and permit the common source of vacuum to re-exhaust the chamber 53 to the same pressure value as chamber 52 and allow the diaphragm 51 to return to the normal position illustrated in Fig. 3 and thereby close the exhaust valve 35.

The foregoing action of the control device results from a normal loading or unloading of passengers from the vehicle.

Under normal road operating conditions, the axle 12 will be in continuous movement relative to the frame 11 of the vehicle, but it is undesirable for the air pressure in the air springs 13 and 14 to vary in response to this axle movement caused by road operating conditions. To prevent the diaphragm 51 from moving in either direction sufficiently to activate either the fluid inlet valve 32 or the fluid exhaust valve 35, the movement of the axle 12 upwardly and downwardly from the neutral position illustrated in Fig. 1, as occurs in normal road operating conditions causes the oscillatable shaft 86 to alternately open the valves 68 and 78 for entry of atmospheric air into the chambers 52 and 53 alternately. So long as the timed average opening of the valves 68 and 78 is the same, the pressure conditions in the chambers 52 and 53 of the fluid motor 50 will remain substantially the same so that there will be insufficient pressure differential created on opposite sides of the diaphragm 51 which tends to urge it to move substantially in either direction of movement. The movement of the axle 12 relative to the frame 11 is of short duration at vehicle axle oscillation frequency under all practical operating conditions, so that the average timed movement upwardly from neutral position is the same as the average timed movement downwardly from neutral position with the result that both valves 68 and 78 will be open substantially the same period of time with equivalent atmospheric air flow through the passages 65 and 75 to maintain the pressure value on opposite sides of the diaphragm at substantially the same level, air being constantly removed through the passages 60 and 61 from the chambers 52 and 53 through the pipe 27 connected with the engine manifold 25.

Preferably, the passages 65, 75, 60 and 61 are orifice restriction passages to restrict the volume flow of fluid through the passages. Thus the restricted flow of fluid into and out of the chambers 52 and 53 on opposite sides of the diaphragm 51 will prevent rapid change in pressure value in the chambers 52 and 53 and thereby damp the movement of the diaphragm 51 to a relatively slow action.

So that the valves 68 and 78 can be properly timed in their opening of the ports 67 and 77, each valve is provided with an adjusting screw 100 and 101 respectively.

While the form of embodiment of the invention as herein disclosed constitutes a preferred form, it is to be understood that other forms might be adopted as may come within the scope of the claims which follow.

What is claimed is as follows:

1. In a vehicle air suspension system having air springs between the unsprung axle and wheel mass of the vehicle and the sprung body and chassis mass of the vehicle, a control valve regulating supply and exhaust of air to and from the air springs of the suspension system, comprising, a housing having wall means forming a first compartment, oppositely acting valve means in the said wall means controlling supply and exhaust of pressure fluid to and from the said compartment, conduit means connecting said compartment with an air spring, said housing including wall means forming a second compartment adjacent the first compartment, a pressure differential responsive member in said second compartment dividing the same into two separate chambers on opposite sides of the said member, means connecting said member with said valve means to operate the same oppositely on movement of the said member in opposite directions, means resiliently urging said member into a neutral position at which said valve means is disposed normally in closed position, conduit means connecting both said chambers with a common source of actuating fluid to establish thereby equivalent pressure in both said chambers to retain thereby said member in neutral static position with said valve means disposed in closed position, an oscillatable actuating member on said housing connected with the axle and wheel mass of the vehicle for oscillatable actuation by axle oscillations of the vehicle, and additional valve means connected separately with each of said chambers and drivingly connected with said oscillatable member for actuation thereby alternately by oscillations of the said axle and wheel mass to control thereby a fluid flow through the said additional valve means independently to each of said chambers and obtain a pressure differential between the said chambers in proportion to the time of opening of one of said additional valve means relative to the other, said member moving in one direction or the other in response to axle oscillations of the vehicle by the said pressure differential created thereby or remaining in neutral position on substantial balance of pressures in the said chambers on substantially equivalent opening times of said additional valve means of short duration at vehicle axle oscillation frequency during axle oscillations of the vehicle.

2. In a vehicle air suspension system having air springs between the unsprung axle and wheel mass of the vehicle and the sprung body and chassis mass of the vehicle, a control valve regulating supply and exhaust of air to and from the air springs of the suspension system, comprising, a housing having wall means forming a first compartment, oppositely acting valve means in the said wall means controlling supply and exhaust of pressure fluid to and from the said compartment, conduit means connecting said compartment with an air spring, said housing including wall means forming a second compartment adjacent the first compartment, a pressure differential responsive member in said second compartment dividing the same into two separate chambers on opposite sides of the said member, means connecting said member with said valve means to operate the same oppositely on movement of the said member in opposite directions, means resiliently urging said member into a neutral position at which said valve means is disposed normally in closed position, conduit means connecting both said chambers with a common vacuum source to establish thereby equivalent vacuum pressure in both said chambers to retain thereby said member in neutral static position with said valve means disposed in closed position, an oscillatable actuating member on said housing connected with the axle and wheel mass of the vehicle for oscillatable actuation by axle oscillations of the vehicle, and additional valve means connected separately with each of said chambers and drivingly connected with said oscillatable member for actuation thereby alternately by oscillations of the said axle and wheel mass to control thereby admission of atmospheric air into each of said chambers independently and obtain a pressure differential between the said chambers in proportion to the time of opening of one of said additional valve means relative to the other, said member moving in one direction or the other in response to axle oscillations of the vehicle by the said pressure differential created thereby or remaining in neutral position on substantial balance of pressures in the said chambers on substantially equivalent opening times of said additional valve means of short duration at vehicle axle oscillation frequency during axle oscillations of the vehicle.

3. A control valve for regulating supply and exhaust of air to and from an air spring of a pneumatic suspension system for a vehicle, comprising, a housing structure having wall means forming a first compartment, a pair of oppositely acting valve means in the said wall means controlling supply and exhaust of pressure fluid to and from said compartment, said wall means having a port for connection with an air spring of a pneumatic suspension system, said housing structure also having wall means forming a second compartment coaxial with the first compartment, a pressure differential responsive member in said second compartment dividing the second compartment into two separate chambers disposed on opposite sides of the said member, spring means in each of said chambers and on opposite sides of said member oppositely acting resiliently against said member urging the same into a neutral static position at which said pair of valve means is disposed in closed position, means engaging said member and extending through wall means common between said first and second compartments connecting the said member with said pair of valve means to actuate one or the other thereof on opposite movements of the said member, said chambers each having passage means for connecting the respective chamber with a common source of fluid to establish thereby in said chambers equivalent pressure on opposite sides of the said member to dispose the same in the said neutral position, a second pair of valve means one each of which is connected separately with each of said chambers to provide for flow of fluid relative to the chamber controlled by the related valve means therefor, an oscillatable member rotatably supported on said housing and connectible with an axle of a vehicle on which the control valve is carried for response to axle oscillations of the vehicle and including means engageable with said second valve means alternately on alternate oscillations of said oscillatable member thereby to effect alternate opening of the said second valve means for flow of fluid relative to the said chambers alternately and effect thereby control of the fluid pressure in each of said chambers and obtain thereby substantially equivalent pressures in the said chambers on substantially equivalent time of opening of said second valve means of short duration at vehicle axle oscillation frequency to maintain the said member substantially in said neutral position and obtain thereby a pressure differential between the said chambers on extended unequal time of opening of said second valve means with resultant movement of the said member in one direction or the other according to the direction of unbalance of pressures in the said chambers.

4. A control valve for regulating supply and exhaust of air to and from an air spring of a pneumatic suspension system for a vehicle, comprising, a housing structure having wall means forming a first compartment, a pair of oppositely acting valve means in the said wall means controlling supply and exhaust of pressure fluid to and from said compartment, said wall means having a port for connection with an air spring of a pneumatic suspension system, said housing structure also having wall means forming a second compartment coaxial with the first compartment, a pressure differential diaphragm in said second compartment coaxial with said compartments and dividing the second compartment into two separate chambers disposed on opposite sides of the said diaphragm, spring means in each of said chambers and on opposite sides of the said diaphragm oppositely acting resiliently against said diaphragm urging the same into a neutral static position at which said pair of valve means is disposed in closed position, means engaging said diaphragm and extending through wall means common between said first and second compartments connecting the said diaphragm with said pair of valve means to acutate one or the other thereof on opposite movements of the said diaphragm, said chambers each having passage means for connecting the respective chamber with a common source of fluid to establish thereby in said chambers equivalent pressure on opposite sides of the said diaphragm to dispose the same in the said neutral position, a second pair of valve means one each of which is connected separately with each of said chambers to provide for flow of fluid relative to the chamber controlled by the related valve means therefor, an oscillatable member rotatably supported on said housing and connectible with an axle of a vehicle on which the control valve is carried for response to axle oscillations of the vehicle and including means engageable with said second valve means alternately on alternate oscillations of said oscillatable member thereby to effect alternate opening of the said second valve means for flow of fluid relative to the said chambers alternately and effect thereby control of the fluid pressure in each of said chambers and obtain thereby substantially equivalent pressures in the said chambers on substantially equivalent time of opening of said second valve means of short duration at vehicle axle oscillation frequency to maintain the said diaphragm substantially in said neutral position and obtain thereby a pressure differential between the said chambers on extended unequal time of opening of said second valve means with resultant movement of the said member in one direction or the other according to the direction of unbalance of pressures in the said chambers.

References Cited in the file of this patent

UNITED STATES PATENTS

| 896,120 | Kramer | Aug. 18, 1908 |
| 2,353,692 | Cunningham | July 18, 1944 |
| 2,361,575 | Thompson | Oct. 31, 1944 |
| 2,670,201 | Rossman | Feb. 23, 1954 |
| 2,719,015 | Anderson | Sept. 27, 1955 |
| 2,724,398 | Higgins | Nov. 27, 1955 |

FOREIGN PATENTS

| 730,965 | Great Britain | June 1, 1955 |